Jan. 22, 1957     C. MAKINSON     2,778,692
LOG CONVEYING
Filed April 14, 1955
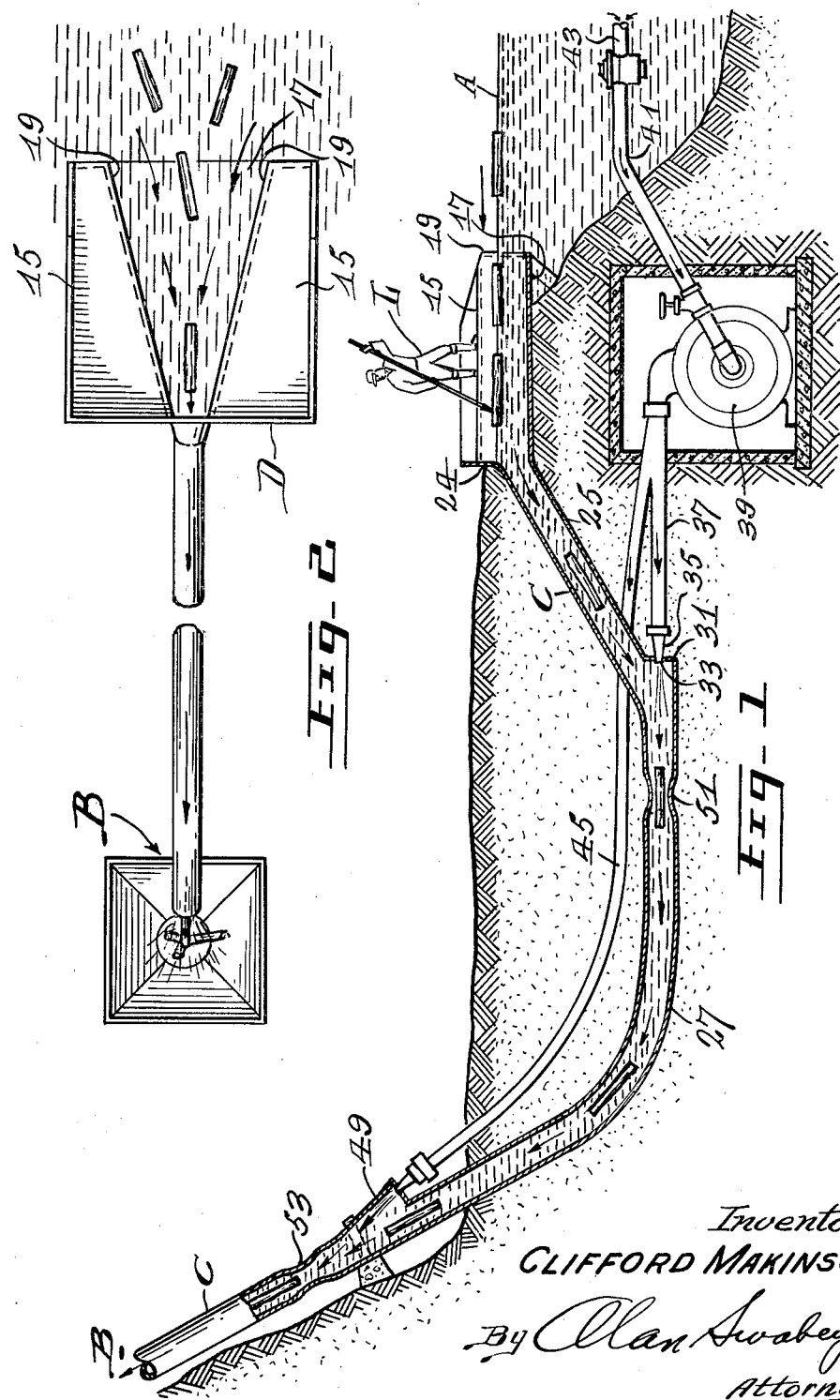
Inventor
CLIFFORD MAKINSON
By Alan Swabey
Attorney

United States Patent Office 2,778,692
Patented Jan. 22, 1957

2,778,692
LOG CONVEYING

Clifford Makinson, Rosemere, Quebec, Canada, assignor to Terry Machinery Company Limited, Montreal, Quebec, Canada, a corporation of Canada Application April 14, 1955, Serial No. 501,377

7 Claims. (Cl. 302—14)

This invention relates to a method of conveying logs.

Logs often have to be conveyed over considerable distances (hundreds of yards to miles), from a basin to which they float from the cutting area, to a terminal, for example, a mill. Sometimes they have to be carried over hills.

There are various ways in which this can be done. Carrying them by rail or by road requires picking them out of the basin, loading and subsequently unloading.

Sluicing only works where the logs are conveyed from a higher to a lower level.

The applicant has devised hydraulic means by which logs can be conveyed from a basin to a terminal whether or not they have to be carried uphill at some stage.

The applicant's method involves the steps of, creating an enclosed stream of a dimension not appreciably greater than the diameter of the logs to be conveyed, injecting water in a jet into the stream at a point close to the basin, and preferably at booster points along the stream so as to create a continuous flow, and causing logs to enter the stream at an intake and to leave it at a terminus remote from the intake. The stream is constricted at a point shortly removed from the jet. This prevents backwash and surges and is vital to the operation of the present invention.

The applicant's apparatus for carrying out this method includes a conduit which leads from a collecting point for the logs to a terminus. The collecting point may be a basin to which the logs are driven and in which a platform is preferably provided including a deck for the logger and confining means forming a channel for receiving the logs and directing them to the entrance of the conduit.

At a point not far from the collecting point, the conduit is provided with a branch entering at an oblique angle and preferably aimed in the direction of flow. A nozzle is connected by a water-tight connection to the branch. The nozzle has a connection through a pipe with a pump adapted to supply water at high pressure. Preferably, similar branch and nozzle arrangements are provided at booster points along the pipe line pressured by the same or auxiliary pumping means. Slightly in advance of each branch is a construction or venturi throat in the pipe line adapted to cause the stream of water passing through the pipe line to speed up at that point and prevent back flow or surges.

This apparatus is operated by feeding in logs at the collecting point. The logs are taken up in the stream created by the jets and are projected through the pipe line at a speed depending on the force of the jets, the contour of the pipe line, friction and other factors.

The invention will now be described in more detail by reference to the accompanying drawings, which show a preferred embodiment and in which:

Figure 1 is a side elevation partly in section (showing particularly the log conveying conduit in section.)

Figure 2 is a plan view of the intake.

This preferred form of the device will now be described by detailed reference to the drawings.

A represents a basin from which logs are to be conveyed to a terminal at a higher level, for example, at B. A conduit or sluice C leads from the basin A to the terminal B.

In the basin A is an intake platform D. The platform D is provided with deck portions 15, intervened by a floor 17 under the water level, and converging vertical walls 19 forming therebetween a narrowing channel 21 for receiving the logs floating on the surface of the basin A. The platform 17 is connected to the mouth of the conduit C so that the channel 21 leads directly into the inlet or mouth 24 of the conduit C.

The sluice C has a downwardly extending portion 25 which leads from the mouth 24, an intermediate portion 27 which extends along the level, and an upwardly extending portion 28. These various portions are only shown by way of example. The pipe line can actually take various contours depending on the terrain.

A branch 31 is formed on pipe C not far from the mouth 24 and enters the pipe C at an oblique angle. A nozzle 33 enters the branch 31 in a water-tight connection as at 35. The nozzle 31 is fed by a pipe 37 leading from a pump 39. The pump 39 draws its water through a pipe 41 having an inlet 43 in the basin A. Another pipe 45 is shown leading from the pump 39. This pipe 45 is connected to a nozzle 47 which enters a branch 49 in the pipe C.

The pipe C is provided with a venturi throat 51 slightly in advance of the branch 31. The pipe C is also provided with a venturi throat 53 slightly in advance of the branch 49.

*Operation*

The operation is as follows.

To prime the pipe line C, water flows in at the inlet 24 and gravitates through the portions 25 and 27. The pump 39 then operates to cause a high pressure jet to be projected into the branch 31. This jet causes a flow of water in the portion 27 through the uphill portion 28 and thence to succeeding portions of the pipe line C and subsequently to the terminal. This flow is boosted by a jet from the nozzle 49. It may be boosted at intervals by additional nozzles and further pumps as required by the job ahead.

The venturi throat 51 prevents back pressure, and stabilizes the flow. The same action takes place at the throat 33.

When the flow has been established as described, the logger L feeds logs into the inlet 24. The logs are immediately taken up one by one and carried through the conduit 27 and eventually reach the terminal B. The pipe line is large enough to take the logs comfortably but not large enough to allow them to straddle the pipe line sideways so as to jam.

The initial portion 17 need not be in a downhill direction—but could be level or uphill as required by the terrain.

It will be understood that the size of the conduit and the order of the pressure employed and other quantitative factors will have to be adjusted to the particular job at hand. The applicant prefers the following dimensions. Where the pipe is a 20 inch pipe which would be used with a 12 inch log for example, the venturi would be about 16 inches. Where the pipe is 30 inches, which would be about the largest pipe employed, the venturi would be preferably around 20 inches. Generally speaking, therefore, the venturi throat should narrow down to about ⅗ to about ⅘ of the diameter of the pipe proper.

I claim:

1. An apparatus for conveying logs from a basin to a terminus of elevation higher than the basin comprising in combination, an enclosed conduit leading to a terminus remote from said basin, a branch diagonally entering said conduit at a point shortly following said basin, a jet nozzle entering said branch, a pump connected to said jet nozzle for supplying water at a high pressure into said branch, a venturi throat in said conduit in advance of the branch whereby a stream of water is set up in the conduit by jet projection into said branch to draw logs from said basin into said conduit and convey them into a stream caused by the jet from the basin to the terminus.

2. An apparatus according to claim 1, in which there is provided at the entrance to the conduit means forming a passage of decreasing width to concentrate the logs and to allow one at a time to enter the conduit.

3. An apparatus according to claim 1, in which the venturi throat has a diameter within the range from about ⅗ to about ⅘ of the diameter of the conduit.

4. An apparatus for conveying logs comprising in combination, an elongated conduit extending from a water containing log collection basin to a log discharging terminus remote from said basin, said conduit having an internal diameter sufficiently greater than the diameter of the logs to accommodate lengthwise passage only of said logs therethrough, at least one pressure nozzle leading into said conduit at a point close to said log collection point, a pump connected to said nozzle for delivering water under high pressure through said nozzle, a venturi throat in said conduit directly in advance of said pressure nozzle whereby, a stream of water from said log collection point is inducted into said conduit and accelerated by said pressurized water injection and venturi throat to constitute a continuous stream adapted to draw logs into said conduit and convey them from said collection basin to said terminus.

5. An apparatus as claimed in claim 4, wherein at least one supplementary pressure nozzle is led obliquely into said conduit at a point remote from said first nozzle and a venturi throat is provided in said conduit in advance of said supplementary water injection point whereby said stream flow is maintained along the length of said conduit regardless of the contour followed by said conduit.

6. An apparatus according to claim 4, in which there is provided at the entrance to the conduit, means forming a passage of decreasing width to concentrate the logs and to allow one at a time to enter the conduit.

7. An apparatus according to claim 4, in which the venturi throat has a diameter within the range from about ⅗ to about ⅘ of the diameter of the conduit.

References Cited in the file of this patent

UNITED STATES PATENTS

| | | |
|---|---|---|
| 368,691 | See | Aug. 23, 1887 |
| 2,470,521 | Preble | May 17, 1949 |